United States Patent [19]

Kassner et al.

[11] Patent Number: 5,368,463
[45] Date of Patent: Nov. 29, 1994

[54] CLOSING UNIT FOR AN INJECTION MOLDING MACHINE

[75] Inventors: Ralf Kassner, Meinerzhagen; Stanislaus Kandula, Bochum; Johann Holzschuh, Meinerzhagen, all of Germany

[73] Assignee: Battenfeld GmbH, Meinerzhagen, Germany

[21] Appl. No.: 883,287

[22] Filed: May 14, 1992

[30] Foreign Application Priority Data

May 14, 1991 [DE] Germany .............................. 4115592

[51] Int. Cl.⁵ .............................................. B29C 45/67
[52] U.S. Cl. .................. 425/171; 425/451.2; 425/451.9; 425/590; 425/595
[58] Field of Search ............... 425/450.1, 451.2, 451.9, 425/589, 590, 595, 171

[56] References Cited

U.S. PATENT DOCUMENTS

| | | | |
|---|---|---|---|
| 3,270,372 | 9/1966 | Hesse | 425/451.2 |
| 3,590,436 | 7/1971 | Akesson et al. | 425/590 |
| 3,697,212 | 10/1972 | Herbst | 425/451.2 |
| 3,716,323 | 2/1973 | Classen | 425/451.2 |
| 4,201,533 | 5/1980 | Holzschuh | 425/451.9 |
| 4,636,167 | 1/1987 | Shibata | 425/450.1 |
| 5,018,961 | 5/1991 | Miese et al. | 425/450.1 |

FOREIGN PATENT DOCUMENTS

| | | |
|---|---|---|
| 1231884 | 1/1967 | Germany . |
| 2020880 | 12/1971 | Germany . |
| WO84/02877 | 8/1984 | WIPO . |

*Primary Examiner*—James Mackey
*Attorney, Agent, or Firm*—Anderson Kill Olick & Oshinsky

[57] ABSTRACT

A closing unit for injection mold machines is disclosed which generally includes two end plates, guide crosspieces connecting the end plates at a distance from one another, an intermediate plate which is parallel to the end plates and displaceable longitudinally relative to the guide crosspieces and moving cylinders which abut an end plate and act at the intermediate plate via their piston rods. The moving cylinders also displace the intermediate plate along the guide crosspiece in the closing and opening direction to vary its distance from the other end plate. The intermediate plate and the other end plate form a gripping plate for the two mold halves of a form tool which is brought into its closing position by the two gripping plates. Increased closing force may be applied to the form tool at a central die via a pressure cushion insertable between one end plate and the intermediate plate.

5 Claims, 10 Drawing Sheets

CLOSING UNIT FOR AN INJECTION MOLDING MACHINE

FIELD OF THE INVENTION

The invention is generally directed to injection mold machines and more particularly to a closing unit for injection molding machines.

BACKGROUND OF THE INVENTION

Closing units of injection molding machines which typically comprise a swivel cylinder for actuation are used for applying the necessary increased closing forces between the cooperating mold parts of the form tool. The swivel plate and swivel cylinder act on a displaceable intermediate plate which forms one mold gripping plate of the closing unit. Since the swivel plate and the swivel cylinder are centrifugal masses which are moved relatively quickly and must be displaced twice for each work cycle (i.e., after closing and before opening the form tool), the proper working of the closing unit can be impaired.

It is therefore an object of the present invention to improve a closing unit in order to dispense with rapidly moved centrifugal masses.

Another object of the invention is to provide a closing unit for an injection molding machine which is more economical to construct.

Yet another object of the invention is to provide a closing unit which includes two multiple-wedge or star-section bodies provided as coupling between the central die and the pressure cushion and are arranged to be displaceable at an angle in a defined manner relative to one another in the normal direction of the opening and closing of the form tool.

SUMMARY OF THE INVENTION

These and other objects of the invention which will become apparent hereafter are achieved by a closing unit for injection molding machines comprising two end plates and a plurality of guide crosspieces connecting the end plates. An intermediate plate substantially parallel to the end plates is displaceable along the guide crosspieces via moving cylinders in order to change its distance relative to the end plates in the closing and opening direction. The intermediate plate and one of the end plates form gripping plates for the two mold halves of a form tool. The form tool is brought into its closing position by the two gripping plates and can be affected by increased closing force via a pressure cushion acting at a central die. The central die can be coupled or uncoupled as desired when the pressure cushion is in the closing position of the form tool.

Two multiple-wedge or star-section bodies are provided as a coupling means between the central die and the pressure cushion and are arranged to be displaceable at an angle in a defined manner in the normal direction of the opening and closing of the form tool. The first multiple-wedge or star-section body at the free end of the central die is constructed as a head piece whose profile projects over the circumference of the die. The pressure cushion has a second multiple-wedge or star-section body with a complementary inner profile. The head piece of the central die can be displaced by the drive with respect to the angle of rotation, at least in a limited manner. Two groups of initiators for the drive of the head piece can sit at the ring piston of the pressure cushion in front of the inner profile, one group assigned to the uncoupled, aligned position and the other group assigned to the coupled, offset position of the two multiple-wedge or star-section bodies.

The length of the central die can be adjusted for varying the distances between the intermediate or movable mold gripping plate holding the form tool in its closed position and one end or stationary gripping plate. The central die can be coupled or uncoupled with the pressure cushion exclusively in the closed position of the form tool. The closing unit permits simple and reliable adjustment to different fitting or installation heights of the form tools and are therefore suitable for use wherever injection molding machines must frequently cooperate with different form tools.

BRIEF DESCRIPTION OF THE DRAWINGS

The invention will be better understood by the Detailed Description of the Preferred Embodiment in connection with the drawings, of which.

DETAILED DESCRIPTION OF THE PREFERRED EMBODIMENT

Figure 1:
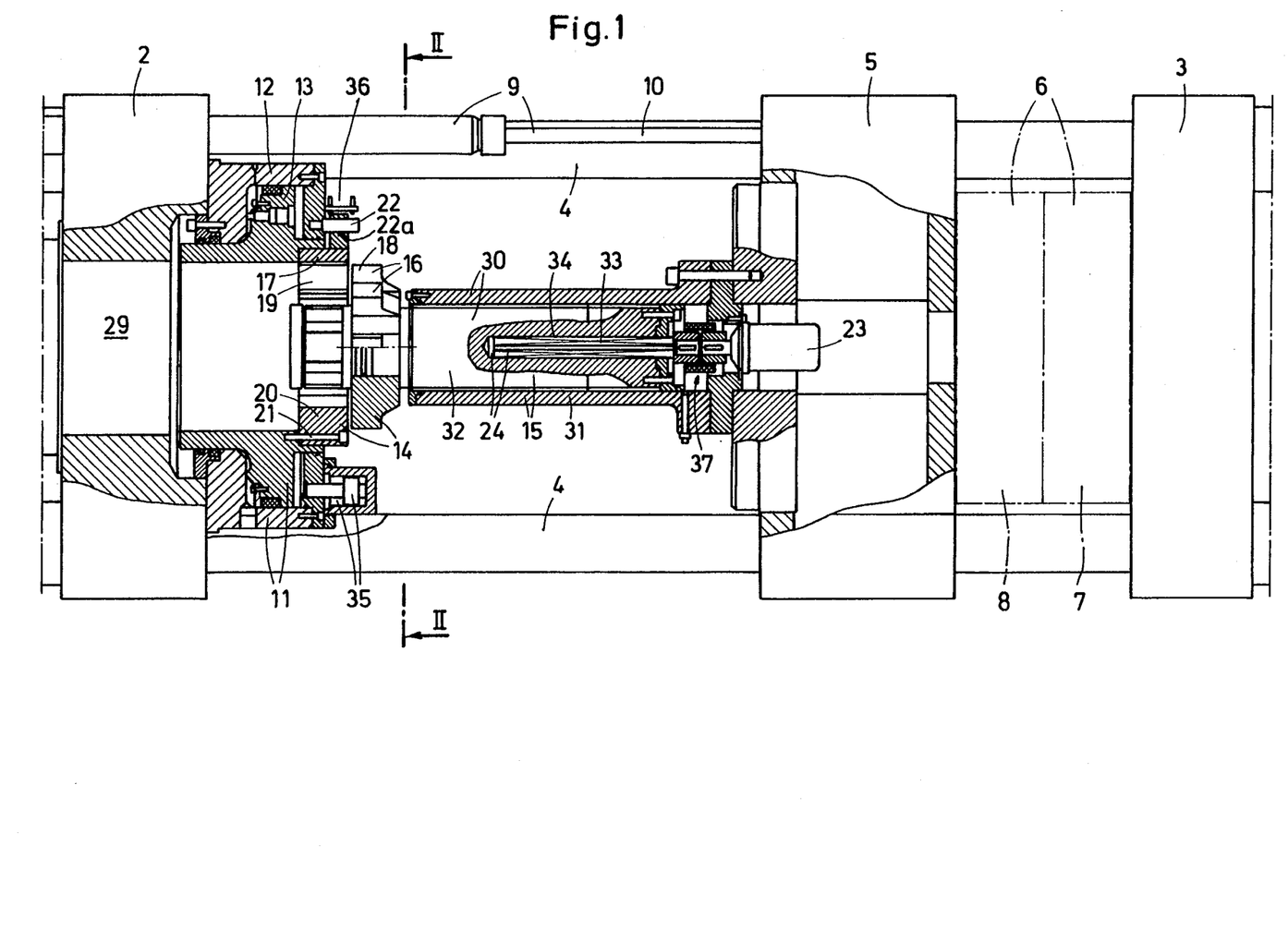
FIG. 1 is a longitudinal, partially side and partially cross-sectional view of a first embodiment of a closing unit for injection molding machines.

Referring now to the drawings, wherein like numerals depict like elements throughout the several views, FIG. 1 depicts a closing unit 1 for injection molding machines having two end plates 2, 3 and plurality of (e.g., four) guide crosspieces 4 which maintains the end plates 2, 3 at a distance from one another. The closing unit 1 further comprises an intermediate plate 5 aligned parallel to end plates 2, 3. The intermediate plate 5 can be displaced along the guide crosspieces 4.

The end plate 3 forms a stationary gripping plate and the intermediate plate 5 forms a movable gripping plate for a form tool 6 (indicated in dash-dot lines). The form tool 6 comprises at least the two mold halves 7 and 8.

The mold half 7 is connected with the end plate 3 of the closing unit 1, forming the stationary gripping plate and the mold half 8 of the form tool 6 is fastened at the intermediate plate 5 of the closing unit 1 forming the movable gripping plate. Moving cylinders 9 have their abutment at the end plate 2 and engage the intermediate plate 5 via their piston rods 10.

Various measures may be taken to insure sufficiently great closing pressure, e.g. 175 bar of the closing unit 1 without placing stress on the moving cylinders 9. When the form tool 6 is brought into its closed position and the two mold halves 7 and 8 are pressed against one another. A pressure cushion 11 comprising a pressure cushion cylinder 12 mounted at the inside of the end plate 2 and a ring piston 13 can be inserted between the end plate 2 and the intermediate plate 5.

The work connection of the pressure cushion 11 with the intermediate plate 5 is only temporary during the injection process and is facilitated via a coupling 14 between the ring piston 13 of the pressure cushion 11 and a central die 15 projecting from the rear of the intermediate plate 5. The pressure cushion can be designed to work in a simple manner when a plurality of, e.g., three, small-volume recoil cylinders for the ring piston are arranged at the pressure cushion cylinder so that this ring piston can be returned to its starting position after the closing pressure is relieved. On the other hand, it is also possible to construct the pressure cushion to be double-acting so that the closing pressure can be built up and relieved directly via the ring piston.

The coupling 14 is formed by two multiple-wedge or star-section bodies 16 and 17 whose installation planes lie transversely relative to the opening and closing directions of the form tool 6. One multiple-wedge or star-section body 16 is provided at the free end of the central die 15 and is constructed as a head piece which projects radially over its circumference with a multiple-wedge or star section 18.

An inner profile 19 which complements the multiple-wedge or star section 18 of the head piece and is constructed in an annular body 20 serves as multiple-wedge or star-section body 17 at the annular piston 13 of the pressure cushion 11. The annular body 20 is arranged at the front side of the ring piston 13 of the pressure cushion 11, preferably detachably fastened via screws 21. The annular body 20 projects cut of the front wall of the pressure cushion cylinder 12 and is displaceably guided at the latter so as to be fixed with respect to rotation relative to it via pins 22 and bearing eyes 22a which engage with one another so as to be displaceable. The head piece is placed in the relief-cut or undercut longitudinal area of the two annular bodies with the aid of the moving cylinders and can be angularly offset in this location if necessary between the engaging position and the disengaging position. In the engaging position of the coupling, not only can the necessary closing pressure be applied at the form tool via such a coupling, but an additional break-loose force can also be brought about via the pressure cushion when opening the form tool. The drive 24 of the head piece can be stopped and defined in the coupled congruent or aligned position of the two multiple-wedge or star-section bodies 16, 17 on the one hand and in the coupled offset position of the latter on the other hand. It has been proven advisable that the multiple-wedge or star-section body 17 comprising the inner profile 18 be formed at the ring piston 13 of the pressure cushion 11 by an annular body which is de-tachably fastened at the front of the latter and projects out of the front wall of the pressure cushion cylinder and is guided at the latter so as to be fixed with respect to rotation relative to it and for the annular body to carry the initiators at its front. In this case, the closing force generated via the pressure cushion 11 can be brought to bear on the form tool via the coupling 14 located between the central die 15 and the pressure cushion 11, while opening the form tool is only possible with the aid of the moving cylinder.

However, if it is desirable to support the moving cylinders 9 at least at the beginning of every opening process for the form tool, the invention provides that two annular bodies 16, 17 as be arranged one after the other at the front side of the ring piston 13 of the pressure cushion 11. The annular bodies conform to one another with respect to the inner profile on the one hand and, on the other hand, the inner profile is relief-cut or undercut between the annular bodies along a longitudinal area which slightly exceeds the thickness of the head piece.

Figure 2:
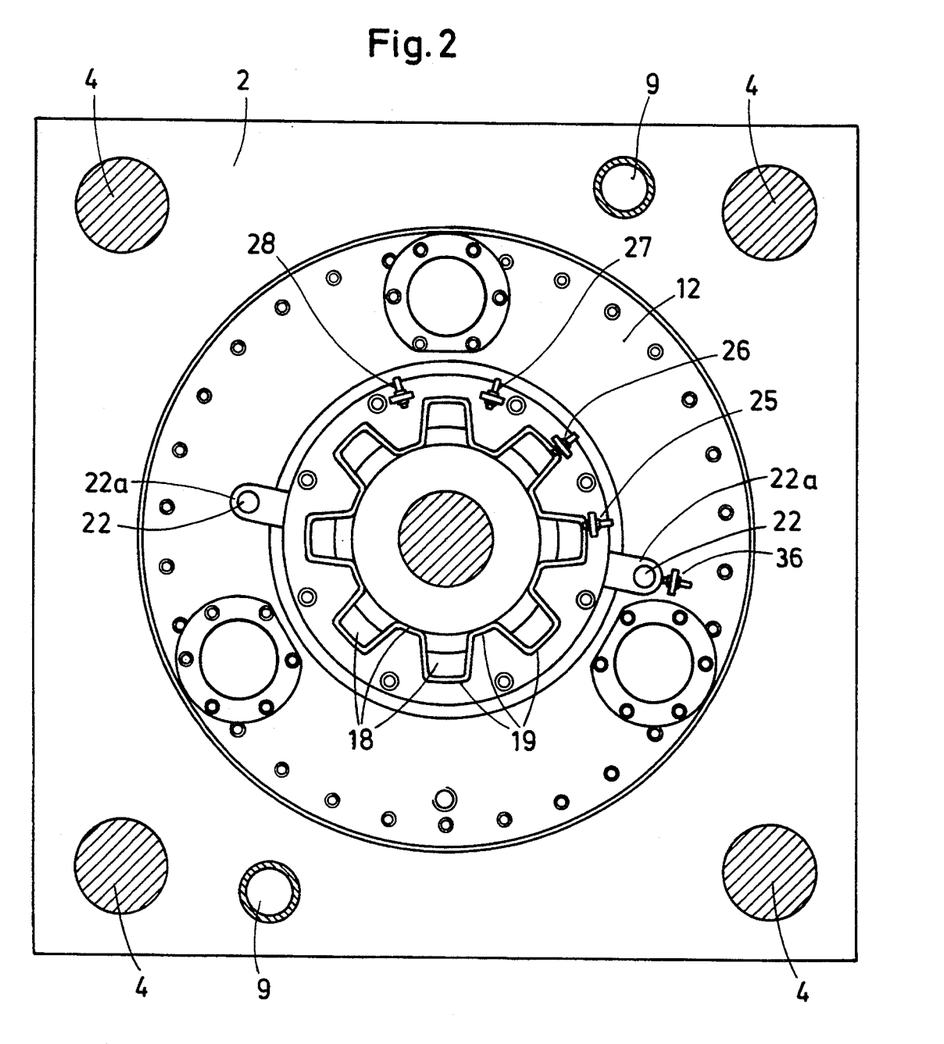
FIG. 2 is a cross-sectional view along line II—II of FIG. 1 depicting the area of the coupling provided between a pressure cushion serving to generate the closing pressure and the displaceable mold gripping plate specifically in The disengaging position of the coupling elements.
Figure 3:
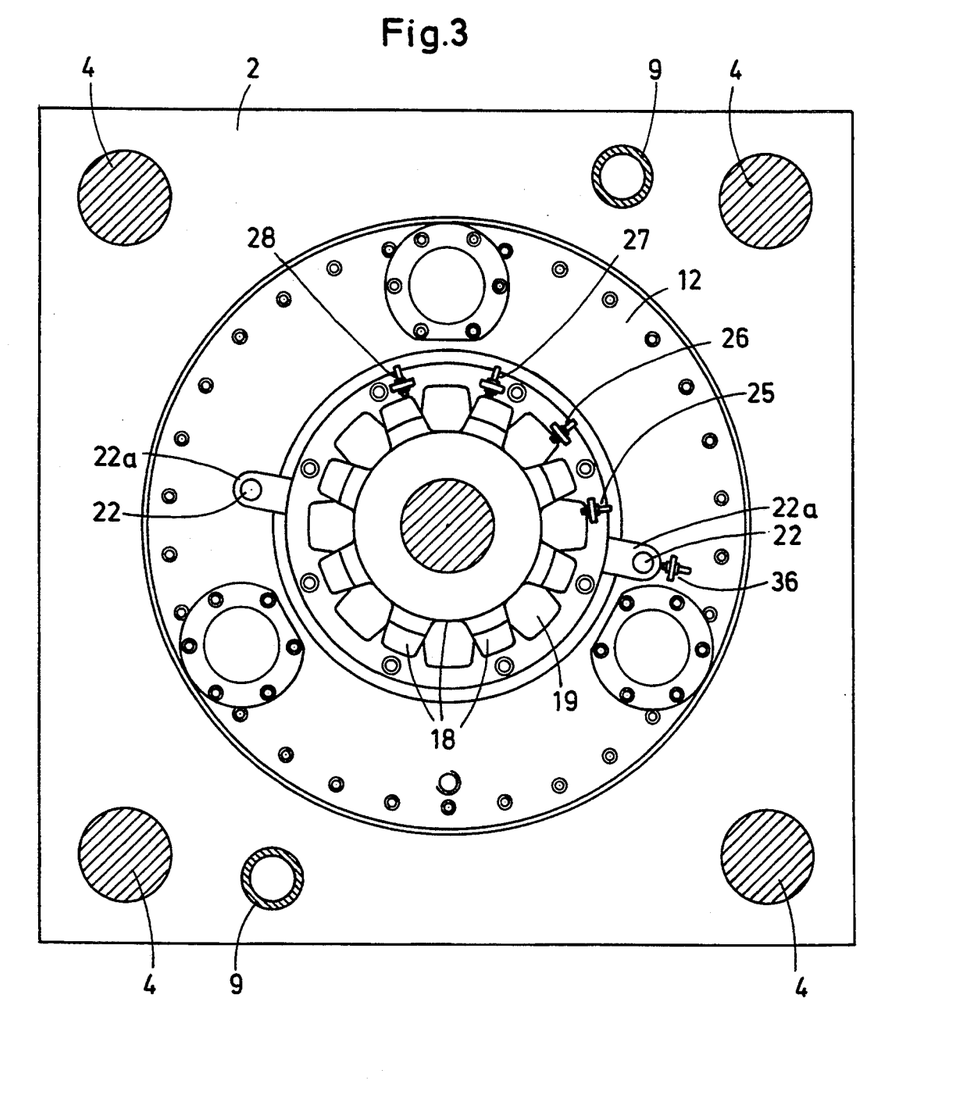
FIG. 3 is a view corresponding to FIG. 2, but depicting the engaging position of the coupling elements.

The head piece forming the multiple-wedge or star-section body 16 is provided with its multiple-wedge or star section 18 at the central die 15 of the intermediate plate 5 via a drive 24 which is actuated by adjusting motor 23 so as to be displaceable at an angle relative to the multiple-wedge or star-section body 17, specifically between the disengaging position as seen in FIG. 2 and the engaging position of the coupling 14 which can be seen from FIG. 3. The adjusting motor is a hydromotor and sits in the intermediate plate and the threaded sleeve of the screw spindle system and engages with a rotary driver, e.g., a square mandrel, coaxially and displaceably in the threaded shaft of the screw spindle system. The hydromotor can be influenced via initiators or triggers 25, 26, 27, 28 assigned in a determined manner to the coupling 14, as can be seen from FIGS. 2 and 3. One group of initiators is assigned to the uncoupled, aligned position and the other group being assigned to the coupled, offset position of the two multiple-wedge or star-section bodies.

The drive 24 can also comprise an electric drive motor, e.g., a servomotor, which is designed as a step motor with means for detecting the rotational path, wherein one definition of the rotational path is assigned to the uncoupled aligned position and the other definition of the rotational path is assigned to the coupled offset position of the two multiple-wedge or star-section bodies.

FIG. 2 shows the multiple-wedge or star section 18 of the multiple-wedge or star-section body 16 in an aligned position with the inner profile 19 of the multiple-wedge or star-section body 17 in the disengaging position (i.e., the teeth of one coupling part are located in the area of the tooth spaces of the other coupling part).

FIG. 3 shows that the toothing and the tooth spaces of one coupling part overlaps the area of the toothing and the tooth spaces of the other coupling part in the engaging position.

Such a step motor with means for detecting and defining the rotational path dispenses with the use of initiators at the ring piston of the pressure cushion in contrast to the previously described construction.

The initiators 25 to 28 of the hydromotor is assigned to one another in pairs 25/26 and 27/28, specifically so that one pair 25/26 defines or inquires about the disengaging position (FIG. 2) of the coupling 14 and the other pair 27/28 defines or inquires about the engaging position (FIG. 3) of the coupling 14. When the initiators 25 and 26 are influenced simultaneously, the adjusting motor 23 can only cause the drive 24 to rotate the multiple-wedge or star-section body 16 out of its disengaging position according to FIG. 2 into the engaging position according to FIG. 3. On the other hand, if the initiators 27 and 28 are influenced simultaneously the adjusting motor 23 only has the possibility of adjusting the drive 24 in such a way that the multiple-wedge or star-section body 16 is rotated at an angle out of its engaging position according to FIG. 3 in the direction of the disengaging position according to FIG. 2.

In the disengaging position of the coupling 14, the intermediate plate 5 of the closing unit 1 can be displaced on the guide crosspieces 4 between the closing position for the form tool 6 and its opening position without obstruction because the central die 15 can penetrate easily into the ring piston 13 of the pressure cushion 11 and a passage 29 in the end plate 2. Passage 29 is coaxial to the pressure cushion 11. This possibility however is blocked if the coupling 14 occupies the engaging position as shown in FIG. 3.

The pressure cushion 11 can build up closing force via the ring piston 13, which can be acted upon in the pressure cushion cylinder 12, exclusively in the engaging position of the coupling 14 according to FIG. 3. The closing force acts on the form tool 6 located in its closing position via the central die 15 and the intermediate plate 5.

Coupling 14 can be quickly and easily changed between its disengaging position and its engaging position because only the small mass of the head piece forming the multiple-wedge and star-section body 16 need be moved beyond a small adjusting angle. This enables reliable operation of the entire closing unit 1 as well as a shortening of the cycle time.

The previously described construction of a closing unit 1 is capable of being used wherever form tools 6 are worked with which always have a determined installation height when the mold halves 7 and 8 contact one another in the closing state. If the closing unit 1 however, is to enable a cooperation with form tools 6 which achieve different installation heights, i.e., between the end plate forming the stationary mold gripping plate and the intermediate plate forming the displaceable mold gripping plate without being impeded by the system for building up the closing force, when the mold halves 7 and 8 contact one another in the closing state, certain additional measures are necessary as explained herein. For example, one end plate comprises a passage coaxial relative to the ring piston of the pressure cushion through which the screw spindle system connected with the intermediate plate can be moved back into position practically along its entire adjusted working length during the opening movement of the form tool after the coupling between the screw spindle system and the pressure cushion has been put into its disengaging position.

Outfitted with these features, an automated adaptation to different installation heights of the respective form tool when exchanging the latter is possible as follows:

the gripping plate formed by the intermediate plate is displaced via the moving cylinders until the form tool is closed and an end position inquiry is effected;

the screw spindle system is actuated by the step motor in order to change its working length;

the actuation of the screw spindle system takes place until its head piece strikes against a determined initiator;

the adjusting motor is braked by the initiator, but a continued adjustment or displacement of the screw spindle system is effected slowly until the head piece actuates an additional initiator which stops the adjusting motor;

the two multiple-wedge or star-section bodies function as coupling between the central die and the pressure cushion are located in their uncoupled rotating adjusting position, one directly in front of the other, when stationary;

the adjustment of the installation height for the respective form tool is concluded; and the form tool however can be opened by moving back the intermediate plate by means of the moving cylinders, since the coupling is in its inactive position.

A closing unit 1 designed in this way applied and removes the increased closing force at the form tool with only small moved masses and, at the same time, makes do with very short adjusting paths. This results not only in shortened cycle times of the closing unit during every injection process, but also leads to an increased operating reliability with reduced construction costs.

The automated operation of a closing unit 1, also when exchanging a form tool, is benefitted according to the invention when the central die 15 is constructed as a screw spindle system with a threaded sleeve 31, a threaded shaft 32 coaxial to the latter, and an adjusting motor 23, the screw spindle system, per se, being longitudinally displaceable, wherein the threaded shaft can be displaced via threads in the threaded sleeve with the head piece. The threaded sleeve 31 is mounted at the rear of the intermediate plate 5 and is fixed with respect to rotation relative to it, while the threaded shaft 32 can be displaced via screws inside the threaded shaft 32. The adjusting motor 23, which is a hydromotor and the drive 24 drive the threaded shaft 32 in rotation relative to the threaded sleeve 31 of the screw spindle system 30. The adjusting motor 23 moves a rotating driver 33, e.g., in the form of a square mandrel, which engages in a complementary driver section 34, e.g., a square channel, of the threaded shaft 32 coaxially and so as to be longitudinally displaceable relative to it.

Whenever a form tool 6 in the closing unit 1 is exchanged, the screw spindle system 30 is preferably moved into its starting position corresponding to the shortest working length of the central die 15 actuation of the adjusting motor 23. After the installation of the new form tool 6, the intermediate plate 5 is moved in the direction opposite the end plate 3 with the aid of moving cylinder 9 until the two mold halves 7 and 8 of the form tool 6 have reached the closing position. An end position inquiry is automatically effected at this time, which sets the adjusting motor 23 in operation, specifically in the direction of a lengthening of the working length of the screw spindle system 30 or central die 15. The change in the working length takes place accompanied by a screwing movement of the threaded shaft 32 inside the threaded sleeve 31. The screwing movement is also carried out by the multiple-wedge or star-section body 16 of the coupling 14, constructed as a head piece.

As soon as one of the teeth of the multiple-wedge or star section 18 of the multiple-wedge or star-section body strikes the initiator or trigger 25 in front of the multiple-wedge or star-section body 17 of the coupling 14 during this screwing movement of the threaded shaft 32, the drive speed of the adjusting motor 23 and the drive 24 actuated by the latter slows down. The angular speed in the rotation of the multiple-wedge or star-section body 16 is thus also reduced relative to the multiple-wedge or star-section body 17 until the moment the two initiators 25 and 26 of the respective pair 25/26 are influenced by adjacent teeth of the multiple-wedge or star section 18. The adjusting motor 23 and the drive 24 are completely stopped at this time because the coupling 14 for the form tool 6 which has now been installed has reached its disengaging position according to FIG. 2.

Before initiating an injection process in the form tool 6, the adjusting motor 23 and the drive 24 are influenced by the activated initiators 25 and 26 in such a way that the coupling moves from its disengaging into the engaging position where the initiators 27 and 28 are activated. The initiators 27 and 28 stop the adjusting motor 23 and the drive 24 and simultaneously or subsequently cause the pressure cushion 11 to be acted upon by hydraulic pressure. The ring piston 13 in the pressure cushion cylinder 12 moves forward and transmits a closing force to the intermediate plate 5 by engaged coupling 14 via the central die 15 or the screw spindle system 30 independently of the moving cylinders 9. The closing force holds the two mold halves 7 and 8 of the form tool 6 together, e.g., with 175 bar.

Every work cycle of the closing unit for an injection process can take place as follows:

- the intermediate plate is displaced via the moving cylinder until the form tool is closed and an end position inquiry is effected;
- the adjusting motor causes an angular rotation of the threaded shaft of the threaded sleeve and accordingly of the head piece until a second group of initiators is actuated and the teeth of the two multiple-wedge or star-section bodies which cooperate as a coupling are accordingly located one in front of the other, that is the coupling is engaged;
- the pressure cushion is actuated and builds up the closing pressure, e.g., 175 bar, at the form tool;
- after the injection process, the pressure in the pressure cushion is relieved and its ring piston is brought into the starting position assigned to the initiators;
- these initiators trigger the adjusting motor 23 in the resetting direction and rotate the head piece 24 of the spindle system back into the uncoupling position which is determined by the respective initiators;
- the moving cylinders draw back the intermediate plate and accordingly open the form tool for removal of the injection molded article, while the head piece of the coupling and the central spindle freely penetrate through the inner profile at the ring piston of the pressure cushion; and
- after a rest period a new work cycle begins.

After the injection process in the form tool 6 is concluded, the pressure in the pressure cushion 11 is canceled and the coupling 14 is accordingly relieved. In a simple working construction of the pressure cushion 1, the piston restorers (e.g., a plurality of small pressure-medium cylinders), are acted upon, which move the ring piston 13 in the pressure cushion cylinder 12 back into its starting position and trigger an initiator 36. This in turn influences the adjusting motor 23 and the drive 24 in the resetting direction so that the coupling 14 moves again from its engaging position into the disengaging position. The moving cylinders 9 are then acted upon in the opening direction by pressure medium via the initiators 25 and 26 and the intermediate plate 5 is displaced along the guide crosspieces 4 to open the tool 6 or to move its two mold halves 7 and 8 apart. In this opening/displacing movement of the intermediate plate 5, the central die 15 or screw spindle system 30 penetrates into the ring piston 13 and the passage 29 of the end plate 2 without the multiple-wedge or star-section bodies 16 and 17 impeding one another until the next work cycle is triggered. The three piston restorers 35 which cooperate with the ring piston 13 so as to be uniformly distributed in the circumferential direction are assigned to the pressure cushion 11 (see FIGS. 2 and 3). The restorer 35 are, of course, not necessary, when the pressure cushion 11 has a double-acting design, i.e., the ring piston 13 in the pressure cushion cylinder 12 can be acted upon at both sides by the pressure medium.

The adjusting motor 23, which is designed as a hydromotor, can be connected in a work connection with the drive 24 via a coupling 37 which can possibly be designed as an electromagnetically working coupling to ensure a particularly exact control of the disengaging position and the engaging position via the initiators 25–28 which are assigned to one another in pairs 25/26 and 27/28. A coupling-brake device must be used as electromagnetic coupling for braking the screw spindle system 30 or another device must be present for fixing the rotating position of the screw spindle system 30.

The fixed stop system assigned to the screw spindle system and/or to the adjusting motor 23 can also be used. This fixed stop system comprises a first rotation defining means for at least one uncoupled, aligned position and a second rotational path defining means for at least one coupled, offset position of the two multiple-wedge or star-section bodies, as well as an additional locking means for the respective coupled, offset position. This not only ensures the defined end positions in the locked and unlocked state of the multiple-wedge or star-section body, but also ensures that an unchanged position of the multiple-wedge or star-section bodies relative to one another remains in the pressureless and tensionless state of the injection molding machine.

The fixed stop system preferably comprises a quantity of rotation defining elements and locking elements corresponding to the number of arms of the multiple-wedge or star-section bodies to ensure a faultless cooperation of the multiple-wedge or star-section bodies forming the coupling in every case.

An adjusting piece which is movable, as desired, out of a release position into a rotational path defining position and into a locking position is in a work connection with the fixed stop system, wherein the locking position of the adjusting piece can be engaged exclusively in the coupled, offset position of the two multiple-wedge or star-section bodies.

Figure 4:
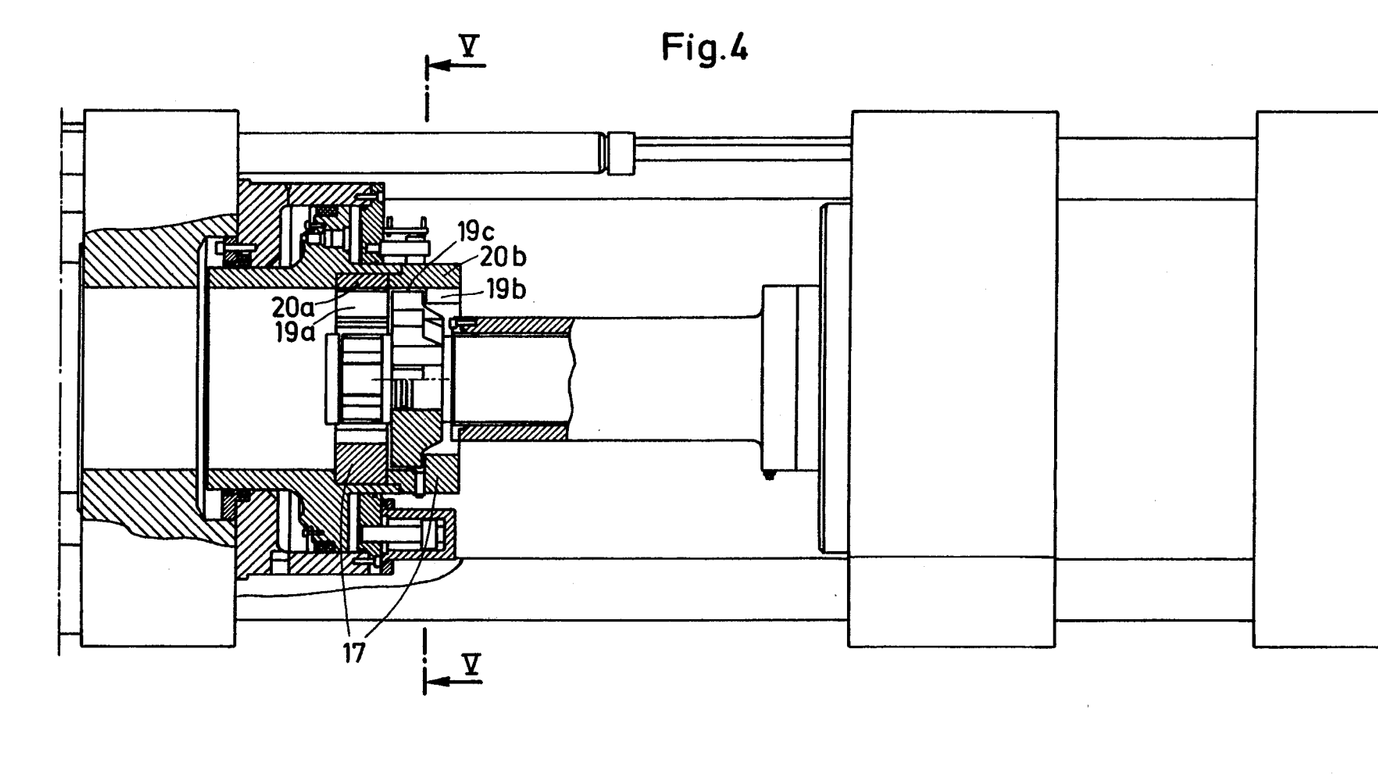
FIG. 4 is a view corresponding to FIG. 1 of a closing unit for injection molding machines depicting a somewhat modified construction of the coupling between the pressure cushion serving to generate closing pressure and the displaceable mold gripping plate.
Figure 5:
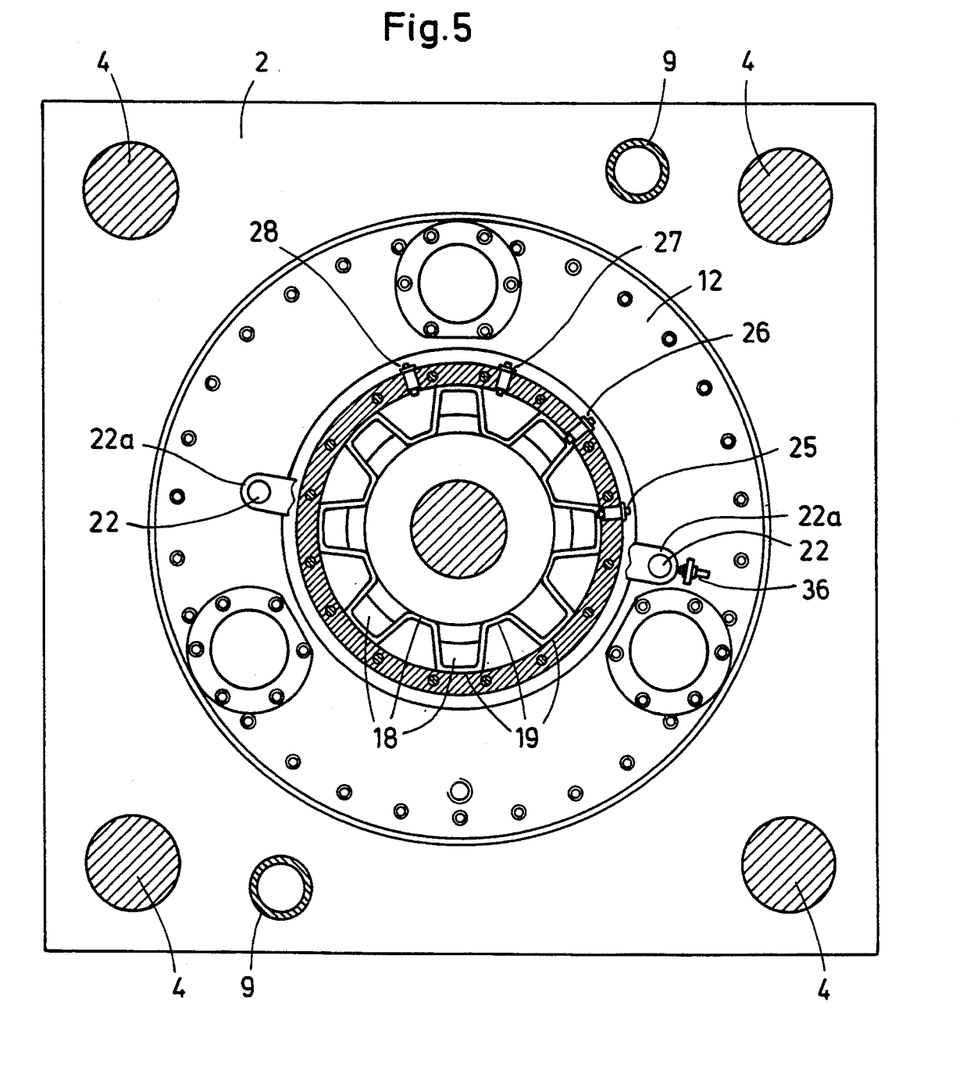
FIG. 5 is a cross-sectional view along line V—V of FIG. 4 through the area of the coupling in its disengaging position.
Figure 6:
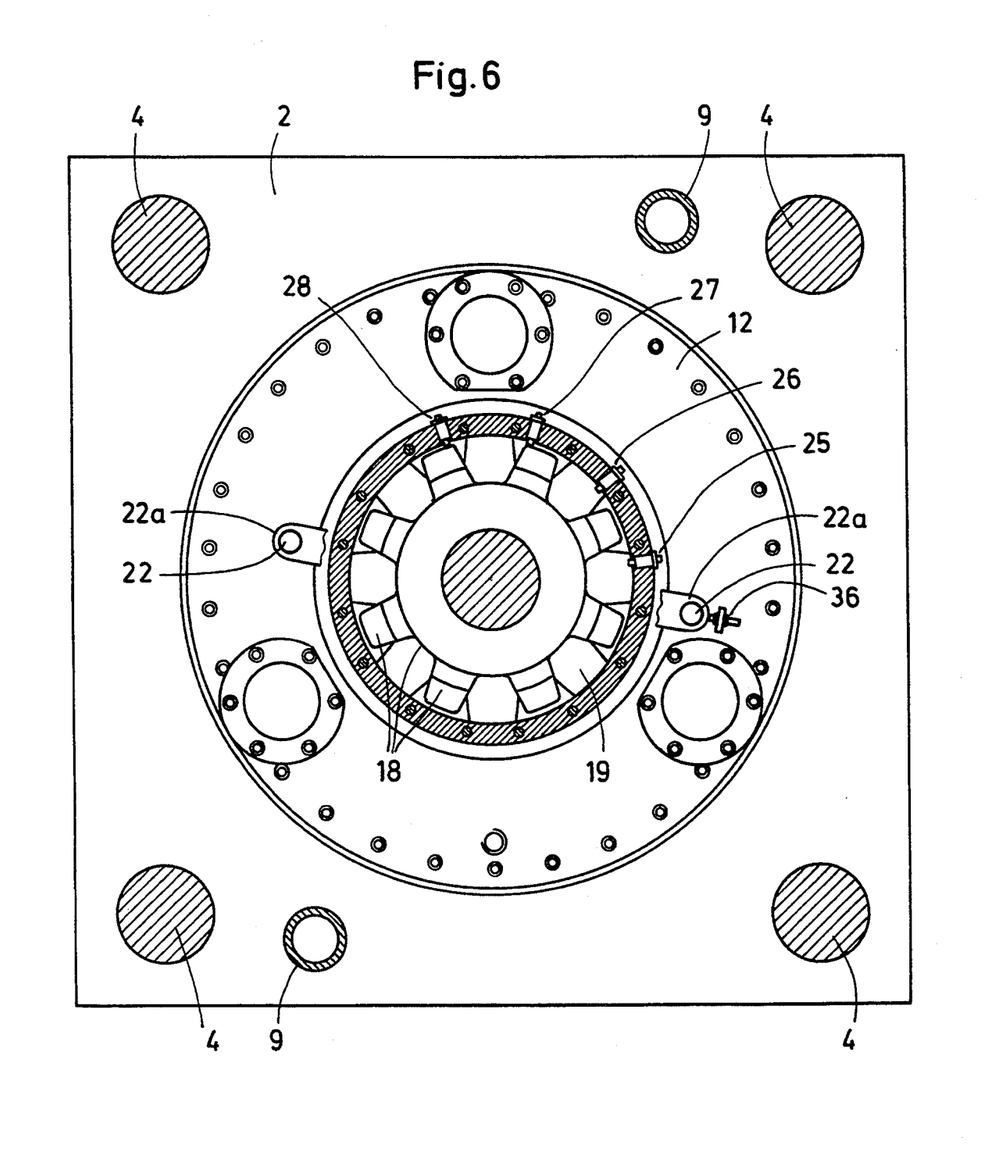
FIG. 6 is a view of the coupling corresponding to FIG. 5, but in its engaging position.

The closing unit 1 shown in FIGS. 4–6 is similar, to a large extent, to the closing unit of FIGS. 1–3. A structural and functional variation lies however in the design of the coupling 14 between the pressure cushion 11 and the central die 15 or screw spindle system 30.

This structural and functional variation concerns the use of the pressure cushion 11 not only for producing the closing force for the form tool 6, but also to initiate the opening process for the form tool 6 after each injection process has been concluded. That is, the pressure cushion 11 must relieve the moving cylinders 9 of the increased force needed for breaking apart the two mold halves 7 and 8. The measures necessary for this purpose chiefly pertains to two annular bodies 20a and 20b which are arranged, one after the other, at the front side of the ring piston 13 of the pressure cushion 11 in such a way that together they form the multiple-wedge or star-section body 17. These two annular bodies 20a and 20b have a matching inner profile 19a and 19b and a free space 19c between them along a longitudinal area slightly exceeding the thickness of the multiple-wedge or star-section body 16 provided as head piece. The free space 19c can be formed by relief-cutting or undercutting the inner profile 19b in the annular body 20b.

The multiple-wedge or star-section body 16 of the central die 15 or main spindle system 30 can be adjusted between the disengaging position of the coupling 14 and the engaging position of the coupling 14 in the free space in the manner already described with reference to FIGS. 1 to 3.

A further modification to FIGS. 1-3, FIGS. 4-6 depicts the initiators 25, 26 and 27, 28 assigned to one another in pairs 25/26 and 27/28 as accommodated inside the free space 19c, i.e., that they can only be influenced by a change in the rotational angle of the multiple-wedge or star-section body 16 when its multiple-wedge or star section 18 penetrates into the free space 19c of the multiple-wedge or star-section body 17 in the proper manner.

Whereas both pressure and tensile forces can be brought to bear on the intermediate plate 5 via the central die 15 and the screw spindle system 30 with the aid of the pressure cushion 11 in the engaging position of the coupling 14 as in FIG. 6. In the disengaging position according to FIG. 5 it is not only possible to let the central die 15 or screw spindle system 30 penetrate through the ring piston 13 of the pressure cushion 11 and the passage 29 of the end plate 2, but also completely to detach the multiple-wedge or star-section body 16 of the coupling 14 from the ring piston 13 of the pressure cushion 11 in the opposite direction by the inner profile 19b of the ring piston 20b. The pressure cushion 11 of FIG. 4 can also cooperate with the additional piston restorers 35, as desired, in a simply working design or can be designed as a double-acting pressure cushion.

Figure 7:
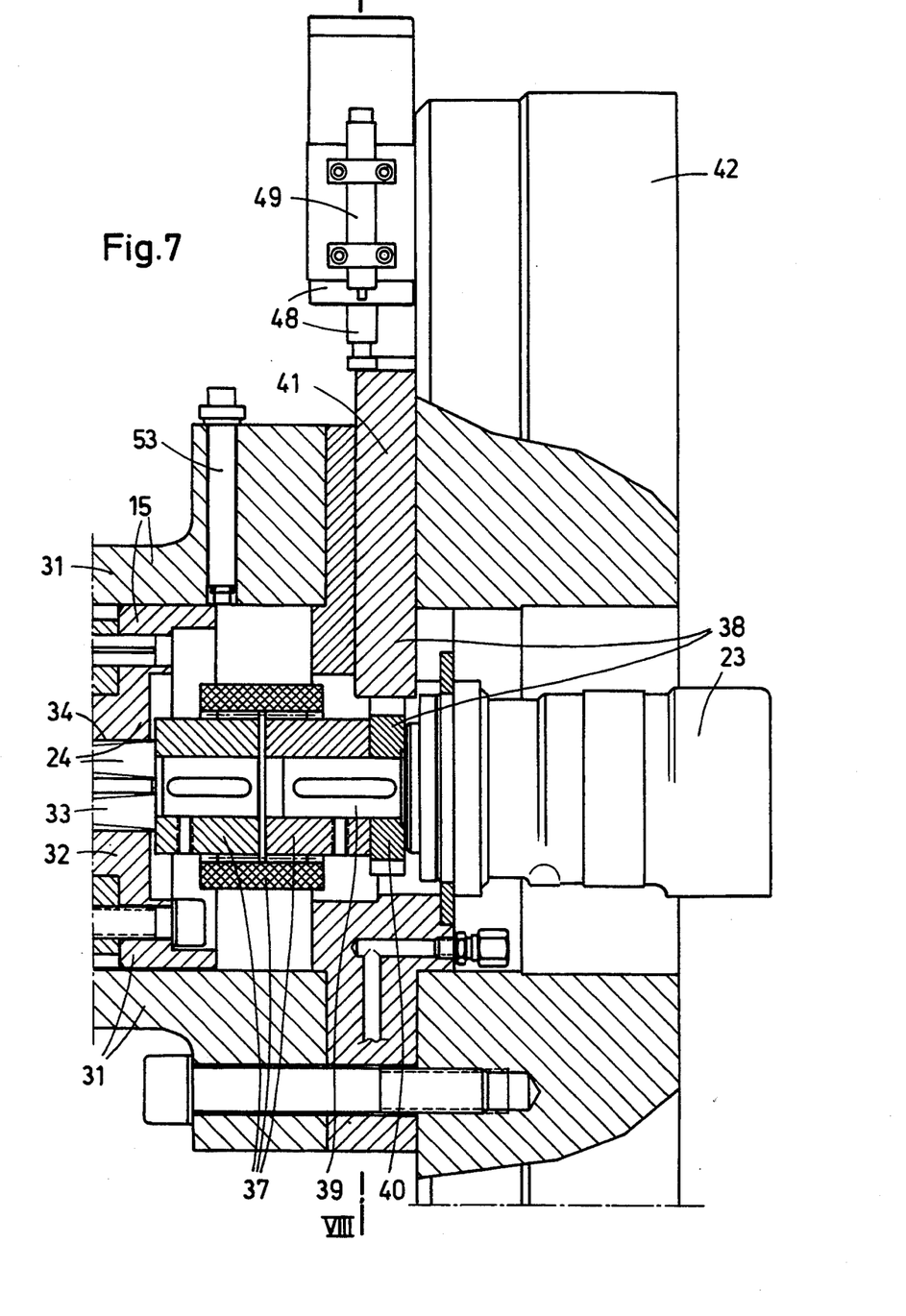
FIG. 7 is a longitudinal, cross-sectional view of another embodiment of a closing unit containing the adjusting motor for the drive of the screw spindle system.

FIGS. 7-10 show details of another embodiment of a closing unit 1 for injection molding machines. FIG. 7 only shows the end area of a central die 15 which acts at the intermediate plate and movable gripping plate 5 of a closing unit 1 and is designed as a screw spindle system 30 with an external threaded sleeve 31 and an inner threaded shaft 32 as previously discussed particularly with reference to FIGS. 1-4 of the drawing.

Figure 8:
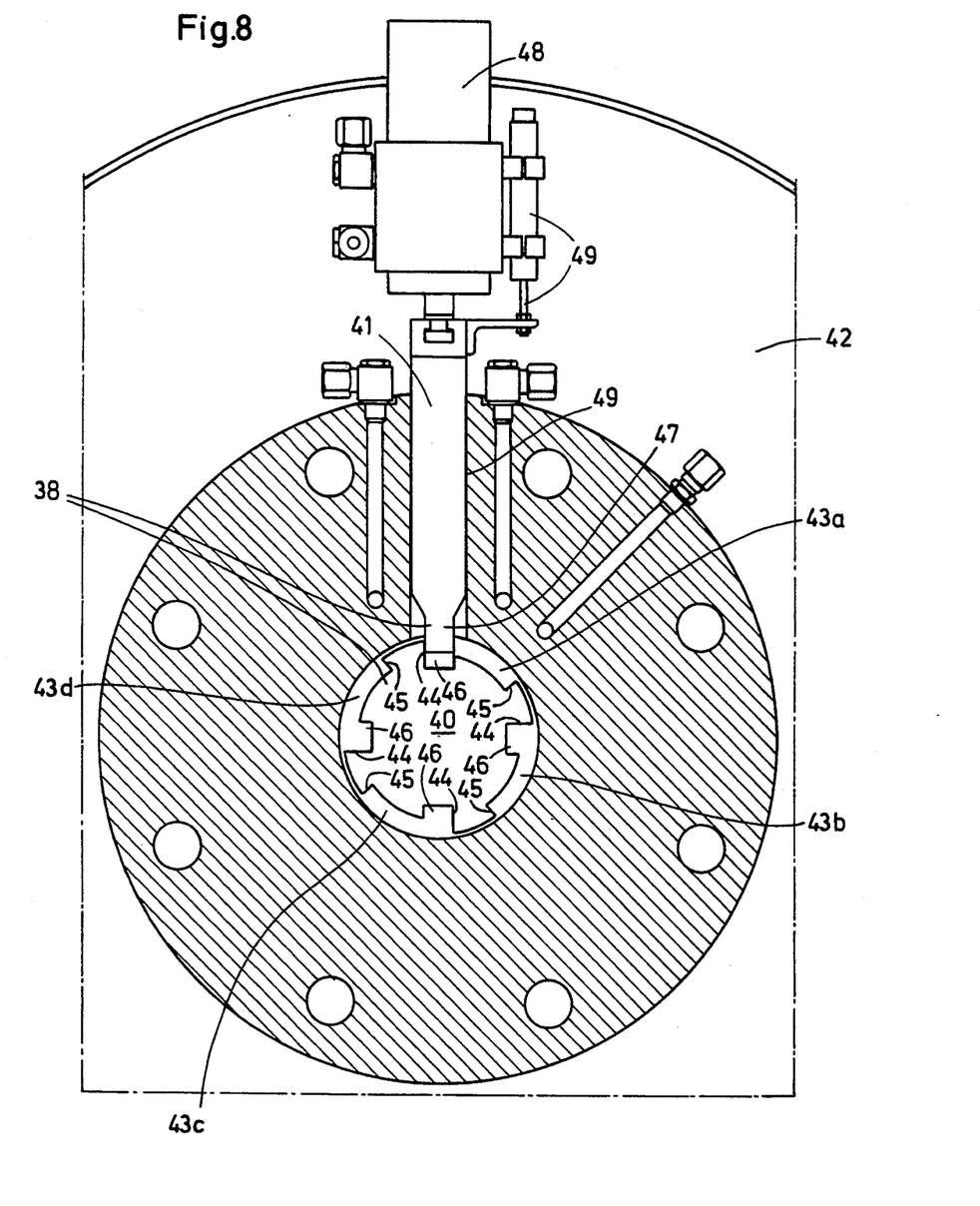
FIG. 8 is a cross-sectional view along line VIII—VIII of FIG. 7.

In contrast to the embodiment examples FIGS. 1-6, it can be seen in FIGS. 7 and 8 a fixed stop system 38 which can also be assigned to the screw spindle system 30 and/or to the adjusting motor 23. The fixed stop system 38 comprises a locking disk 40, which, for instance, is wedged onto the shaft 39 of the adjusting motor 23 and an adjusting piece 41 which is displaceable relative to the latter in the radial direction in three different function positions and is guided at a supporting plate 42 which can be connected with the intermediate plate and movable gripping plate 5 of the closing unit 1.

Figure 9:
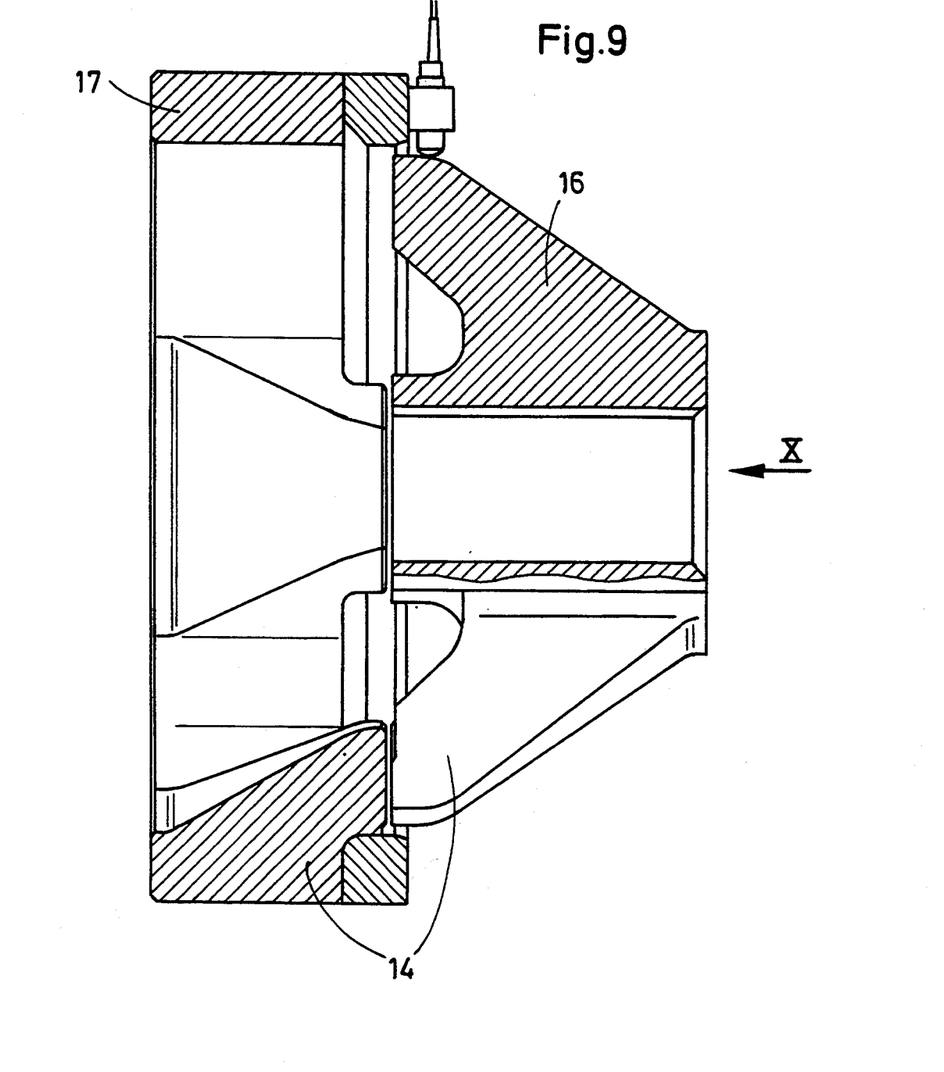
FIG. 9 is a longitudinal, cross-sectional view of a coupling element belonging to the closing unit according to FIG. 7 in its engaging position.
Figure 10:
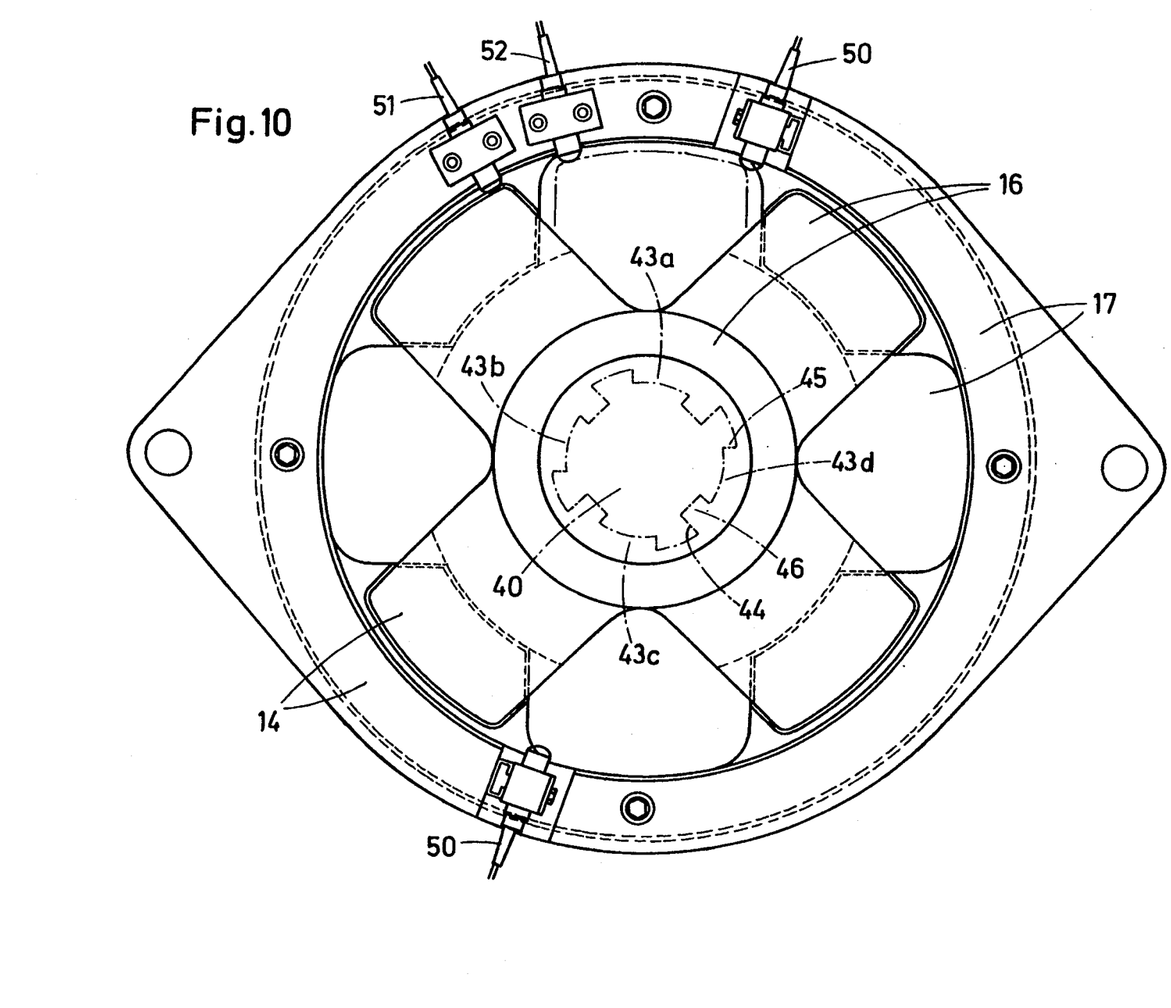
FIG. 10 is a cross-sectional view of the coupling elements according to FIG. 9 in the direction of arrow X.

The locking disk 40 of the fixed stop system 38 has, at its circumference, a number (e.g., four) of rotation defining elements 43a, 43b, 43c, 43d corresponding to the number of arms of the multiple-wedge or star-section bodies 16 and 17 of the coupling 14 which are shown in FIGS. 9 and 10. Each rotation defining element 43a, 43b, 43c, 43d, is formed by a circumferential notch in the locking disk 40 extending along a determined angular area, e.g., 45°, and is defined by two radial stop faces 44 and 45. Moreover, a locking element in the form of a notch 46 which is directed radially inward is assigned to every stop face 44 of the rotation defining elements 43a to 43d.

The adjusting piece 41 can enter into a working connection via a locking projection 47 with each one of the rotation defining elements 43a-d or its stop faces 44 and 45 and its locking element 46. For this purpose, the adjusting piece 41 can be put into three different function positions via an actuating device 48, e.g., a pressure medium cylinder, inside the radial guide 49 of the supporting plate 42 with its locking projection 47. In the middle function position of the adjusting piece 41, as is shown in FIG. 8, its locking projection lies in the effective area of the two stop faces 44 and 45 of one of the rotation defining elements 43a-d, e.g., rotation defining element 43a. Accordingly, the drive rotation area for the adjusting motor 23 and consequently also for the threaded shaft 32 of the screw spindle system 40 is limited to 45°. Consequently, the multiple-wedge or star-section body 16 can also be rotated only by 45° relative to the multiple-wedge or star-section body 17. Consequently, the multiple-wedge or star-section body 16 can only be shifted between its uncoupled, aligned position and its coupled offset position relative to the multiple-wedge or star-section body 17. The coupled offset position of the two multiple-wedge or star-section bodies 16 and 17 can be fixed via the adjusting piece 41 in that its locking projection 47 engages in the notch 46 of the locking disk 40 adjacent to the respective contacting stop face 44 as locking element.

On the other hand, a free rotational driving of the threaded shaft 32 in the screw spindle system 30 by the adjusting motor 23 is possible when the locking projection 47 of the adjusting piece 41 is withdrawn entirely from the area of the rotation defining elements 43a to 43d via the actuating device 48. It is then possible to adjust the length of the central die 15 formed by the screw spindle system 30 without difficulty so that it can act on the form tool 6 which is brought into its closing position by the closing unit 1 proceeding from the pressure cushion 11 for generating closing force.

The three different function positions of the adjusting piece 41 with its locking projection 47 relative to the locking disk 40 are monitored by a detection transmitter 49 which is assigned, e.g., to the actuating device 48. The actuating device 48 and/or the distance detection transmitter 49 cooperate with different initiators 50-53. The initiators 50-52 are assigned to the coupling 14 at the multiple-wedge or star-section body 17 and cooperate with the other multiple-wedge or star-section body 16 for alternate adjustment of the uncoupled, aligned position or coupled, offset position. On the other hand, the initiator 53 is assigned to the screw spindle system 30 between the threaded sleeve 31 and the threaded shaft 32 which activates the actuating device 48 in the rear position of the threaded shaft 32 and accordingly transfers the locking projection 47 relative to the locking disk 40 out of its release position into the middle rotation defining position in one of the rotation defining elements 43a-d, as is indicated in FIG. 8 via the adjusting piece 41. The threaded shaft 32 can now be rotated relative to the threaded sleeve 31 only beyond an angular area determined by the two stops 44 and 45 of the respective rotation defining element 43a-d.

In order to exchange a form tool 6 in the closing unit 1 of FIGS. 7-10, the fixed stop system 38 is located in the function engagement corresponding to FIG. 8 after a work cycle has been concluded. The fixed stop system 38 is brought into its release position by a tool exchange signal given via the control unit of the injection molding machine. An adjustment of the screw spindle system 30 forming the central die 15 now takes place until the initiator 53 responds in the rear position of the threaded shaft 32. This initiator 53 influences the actuating device 48 in such a way that the fixed stop system 38 arrives again in a rotation defining position in which the locking projection 47 engages in one of the rotation defining elements 43a-d. The rotary drive of the threaded shaft 32 inside the threaded sleeve 31 of the screw spindle system 30 is continued until the stop face 44 of the respective rotational path defining element 43a strikes against the locking projection 47 and the adjusting motor 23 is accordingly blocked against further rotation. The blocking of the adjusting motor 23, which is designed, for instance, e.g., as a hydromotor, leads to an increase in pressure which is picked up by a pressure sensor. The pressure sensor then influences the actuating device 48 in such a way that the latter moves the adjusting piece 41 and the locking projection 47, into its lock position so that the latter engages in the notch 46 of the locking disk 40 adjacent to the stop face 44 as locking element. Accordingly, a definitive position of the locking disk 40 and consequently also of the threaded shaft 32 in the screw spindle system 30 is ensured. In this position the closing unit 1 can now be opened by the movement of the intermediate plate or movable gripping plate 5 for exchanging the tool.

The fixed stop system 38 is made inactive again by the moving together of the two mold halves 7 and 8 of the form tool 6 in the setting operation of the closing unit 1 so as to enable an unimpeded adjustment of the screw spindle system 30 forming the central die 15. The threaded shaft 32 in the threaded sleeve 31 is adjusted via the adjusting motor 23 and the drive 24 until the two initiators 50 at the multiple-wedge or star-section body 17 respond by striking against the multiple-wedge or star-section body 16. The fixed stop system 38 is triggered by the initiators 50, specifically in such a way that the actuating device 48 moves the locking projection 47 into the middle rotation defining position via the adjusting piece 41, i.e., engages in one of the rotational path defining elements 43a-d at the locking disk 40. As soon as the stop face 44 is reached by the defined, continued rotation of the threaded shaft 32, the initiator 51 is actuated because the two multiple-wedge or star-section bodies 16 and 17 of the coupling 14 have arrived in their coupled offset position relative to one another. The pressure build-up of the pressure cushion 11 is then initiated by the initiator 51 so that the closing force can act on the form tool 6 via the central die 15 and the intermediate plate or movable gripping plate 5.

The adjusting motor 23 of the drive 24 for the screw spindle system 30 can be designed as a pneumatic, hydraulic or electric servomotor. After the closing and injection processes have been carried out, the adjusting motor 23 is actuated in the opposite rotating direction and an angular rotation of the threaded shaft 32 in the threaded sleeve 31 of the screw spindle system 30 is accordingly triggered via the drive 24, the angular rotation being limited by the stop face 45 of a rotational path defining element 43a-d of the locking disk 40. In this position, the initiator 52 responds and signals that the two multiple-wedge or star-section bodies 16 and 17 of the coupling 14 occupy their uncoupled, aligned position relative to one another, which enables an opening movement of the closing unit 1 in that the central die 15 or screw spindle system 30 penetrates into the ring piston 13 of the pressure cushion 11 and the passage 29 of the end plate 2 shown in FIGS. 1 and 4.

A step motor with rotational path detection can be advantageously used as electric servomotor because it is possible in this way not only to actuate the screw spindle system 30, but also to actuate the respective coupling 14 without the fixed stop system 38 and the initiators 50 to 53 being needed.

Finally, it is noted that the closing force for the form tool 6 can be applied via the pressure cushion 11 not only statically, but also dynamically in the form of a pressing force along a path defined by the lifting length of the pressure cushion 11. The latter is particularly advantageous in carrying out a so-called injection stamping method with a form tool 6 suited for this purpose.

While the preferred and alternate embodiments of the invention have been described in detail, various modifications and adaptations thereof may be implemented without departing from the spirit and scope of the invention, as defined in the following claims.

What is claimed is:

1. A closing unit for an injection molding machine including a form tool having two mold sections, the closing unit comprising:

two spaced end plates;

a plurality of guide crosspieces for connecting said end plates;

an intermediate plate extending parallel to the end plates and movable along the crosspieces, the intermediate plate and one of the end plates defining gripping means for the two mold sections of the form tool;

means for moving the intermediate plate along the crosspieces in closing and opening directions of the form tool for changing a distance between the intermediate and said one end plate to thereby effect closing and opening, respectively, of the form tool, said moving means comprising pressure cylinders supported against the other end plate and each having a rod engaging the intermediate plate;

means for applying an increased closing force to the intermediate plate in a closed position of the form tool, the applying means comprising:

a central die having a first part fixedly connected to the intermediate plate for joint longitudinal displacement therewith, and a second part connected to the first part for joint longitudinal displacement therewith, and for rotational and longitudinal movement relative thereto, a pressure cushion arranged between the intermediate plate and said other end plate for applying a force to the central die, means for connecting the pressure cushion to the central die, the connecting means comprising a first member fixedly connected to the second part of the central die for joint rotational and longitudinal movements therewith and formed as a head piece having a multiple-section profile projecting beyond a circumference of the central die, and a second member forming a part of the pressure cushion and formed as a ring piston having an inner profile complementary to the multiple-section profile of the head piece, and drive motor means for rotating and longitudinally displacing the second part of the central die in response to closing of the form tool, to effect coupling of the first member of the connecting means with the second member of the connecting means to connect the pressure cushion to the central die to apply the force to the central die, whereby an increased closing force is applied to the intermediate plate;

wherein the first part of the central die is a sleeve having an inner thread, and the second part is a spindle having an outer thread engaging the inner thread of the sleeve, the drive means comprising means for effecting longitudinal displacement of the second part at different speeds, in accordance with a longitudinal and angular position of the first member of said connecting means relative to the second member of said connecting means, and means for determining the longitudinal and angular position of the first member relative to the second member.

2. A closing unit for an injection molding machine including a form tool having two mold sections, the closing unit comprising:

two spaced end plates;

a plurality of guide crosspieces for connecting said end plates;

an intermediate plate extending parallel to the end plates and movable along the crosspieces, the intermediate plate and one of the end plates defining gripping means for the two mold sections of the form tool;

means for moving the intermediate plate along the crosspieces in closing and opening directions of the form tool for changing a distance between the intermediate and said one end plate to thereby effect closing and opening, respectively, of the form tool, said moving means comprising pressure cylinders supported against the other end plate and each having a rod engaging the intermediate plate; and means for applying an increased closing force to the intermediate plate in a closed position of the form tool, the applying means comprising:

a central die having a first part fixedly connected to the intermediate plate for joint longitudinal displacement therewith, and a second part connected to the first part for joint longitudinal displacement therewith, and for rotational and longitudinal movement relative thereto, a pressure cushion arranged between the intermediate plate and said other end plate for applying a force to the central die, means for connecting the pressure cushion to the central die, the connecting means comprising a first member fixedly connected to the second part of the central die for joint rotational and longitudinal movements therewith and formed as a head piece having a multiple-section profile projecting beyond a circumference of the central die, and a second member forming a part of the pressure cushion and formed as a ring piston having an inner profile complementary to the multiple-section profile of the head piece, drive motor means for rotating and longitudinally displacing the second part of the central die in response to closing of the form tool to effect coupling of the first member of the connecting means with the second member of the connecting means to connect the pressure cushion to the central die to apply the force to the central die, whereby an increased closing force is applied to the intermediate plate; and stop means for defining relative positions of the first and second members of the connecting means, the stop means comprising first means for limiting a rotational angle of the first member of the connecting means in an uncoupled position of the first and second members, second means for limiting a rotational angle of the first member in a coupled position of the first and second members, and means for locking the first and second members in the coupled position thereof.

3. The closing unit of claim 2, wherein said stop means comprises a plurality of elements for defining respective rotational angles, and said locking means comprises a plurality of locking elements corresponding in number to a number of cooperating profiled elements of the multiple-section profile of the first member and the inner profile of the second member.

4. The closing unit of claim 3, wherein the stop means includes an adjusting member selectively movable from a release position, in which it does not interfere with rotation of the first member, into a rotational angle defining position in which it limits the rotation of the first member to a predetermined angle, and into a locking position in which it is operatively associated with a respective locking element to prevent rotation of the first member.

5. The closing unit of claim 2, wherein the drive means comprises a motor having an output shaft engageable in a channel provided in the second part, wherein the stop means comprises a locking disc fixedly secured on the output shaft and having a plurality of rotation-limiting elements thereon, each of which has opposite stop end surfaces, a locking projection for engaging respective stop end surfaces in respective rotation-limiting positions of the locking disc, each of the rotation-limiting elements having a projection cooperating with the locking projection in a locking position of the first and second members, the closing unit further comprising means for sensing a rotational angle of the output shaft, and means for displacing the locking projection relative to the locking disc in accordance with the sensed rotational angle.

* * * * *